United States Patent [19]

Kim

[11] 4,378,590
[45] Mar. 29, 1983

[54] REGISTER ALLOCATION APPARATUS

[75] Inventor: Dongsung R. Kim, Laguna Hills, Calif.

[73] Assignee: Burroughs Corporation, Detroit, Mich.

[21] Appl. No.: 183,732

[22] Filed: Sep. 3, 1980

[51] Int. Cl.³ .................................................. G06F 11/30
[52] U.S. Cl. .................................................. 364/200
[58] Field of Search .............................. 364/200, 900

[56] References Cited

U.S. PATENT DOCUMENTS

| | | | |
|---|---|---|---|
| 3,348,210 | 10/1967 | Ochsner | 364/200 |
| 3,643,227 | 2/1972 | Smith et al. | 364/200 |
| 4,047,160 | 9/1977 | Wolf | 364/900 |
| 4,084,228 | 4/1978 | Dufond et al. | 364/200 |
| 4,121,286 | 10/1978 | Venton et al. | 364/200 |
| 4,214,305 | 7/1980 | Tokita et al. | 364/200 |

Primary Examiner—James D. Thomas
Assistant Examiner—David Y. Eng
Attorney, Agent, or Firm—Nathan Cass; Kevin R. Peterson; David G. Rasmussen

[57] ABSTRACT

Register selection apparatus which includes a plurality of specially mapped programmable memories each addressed by a respective portion of an updatable allocation register which indicates the free and assigned states of a plurality of registers. The resulting memory words read out from the memories are applied to a plurality of multiplexers for identifying a particular predetermined group of registers as being available for assignment. The memory words also provide signals for use in determining whether a sufficient number of free registers are currently available for assignment.

11 Claims, 3 Drawing Figures

FIG.3.

| MULTIPLEXER M1 INPUTS: 1A, 1B | | MULTIPLEXER M2 INPUTS: 2A,1B,2B | | MULTIPLEXER M3 INPUTS: 3A,1B,2B,3B | | MULTIPLEXER M4 INPUTS: 4A,1B,2B,3B,4B | | MULTIPLEXER M5 INP: 5A,1B,2B,3B,4B,5B | |
|---|---|---|---|---|---|---|---|---|---|
| M1 | M1 | M2 | M2 | M3 | M3 | M4 | M4 | M5 | M5 |
| 0 | 1A | 00 | 2A | 00 | 3A | 000 | 4A | 000 | 5A |
| 1 | 1B | 01 | 1B | 01 | 1B | 001 | 1B | 001 | 1B |
| - | - | 10 | 2B | 10 | 2B | 010 | 2B | 010 | 2B |
| - | - | - | - | 11 | 3B | 011 | 3B | 011 | 3B |
| - | - | - | - | - | - | 100 | 4B | 100 | 4B |
| - | - | - | - | - | - | - | - | 101 | 5B |

REGISTER ALLOCATION APPARATUS

BACKGROUND OF THE INVENTION

This invention relates to means and methods for allocating resources in an electronic digital data processing system.

As is well known, an important function performed within a data processing system having multi-programming and/or multiprocessing capabilities is the allocation of the available resources to the various data processing operations being performed. The manner and efficiency of this allocation of resources can have a significant impact on system performance and economy.

SUMMARY OF THE PRESENT INVENTION

A primary object of the present invention is to provide particularly useful and advantageous apparatus for allocating resources in a data processing system.

In a preferred embodiment, the principles of the invention are applied to the function of allocating registers required for use by a plurality of tasks being concurrently performed by a data processing system. Typically, the system provides a predetermined number of registers which are allocatable for use by a plurality of active tasks. In the preferred embodiment, an updatable list of free and assigned registers is maintained and, as each task is activated, specially provided register selection apparatus responsive to this list selects a predetermined number of free registers for assignment to the task. If insufficient free registers are available for use by a newly activated task, it is signalled to remain in a "hold" state.

In the preferred embodiment, the register selection apparatus includes a plurality of specially mapped memories to which respective portions of the updatable list of free and assigned registers are applied as memory addresses for reading out selected memory words. These selected memory words identify available free registers and also provide appropriate logic for controlling a plurality of multiplexers to which the selected memory words are applied. These multiplexers operate to select a particular plurality of the available free registers for assignment to each newly activated task where sufficient free registers are available to meet the task's requirements. The sufficiency of free registers for a newly activated task is determined by comparing the number of free registers required by a task with the total number of free registers which the selected memory words indicate are available. If insufficient free registers are available for assignment to a task, the comparator provides a "hold" signal for use in placing the task in a "hold" state.

The combination of the list of free and unassigned registers, the specially mapped memories and the multiplexers, as briefly described above, provide for register allocation in a highly advantageous and economical manner which is well suited for use in a multiprogramming and/or multiprocessing environment.

The specific nature of the invention as well as other objects, advantages, features and uses thereof will become apparent from the following detailed description taken in conjunction with the accompanying drawings.

BRIEF DESCRIPTION OF THE DRAWINGS

FIG. 3 is a series of tables illustrating the operation of the multiplexers in FIG. 2.

DETAILED DESCRIPTION OF THE INVENTION

Like numerals refer to like elements throughout the drawings.

Figure 1:
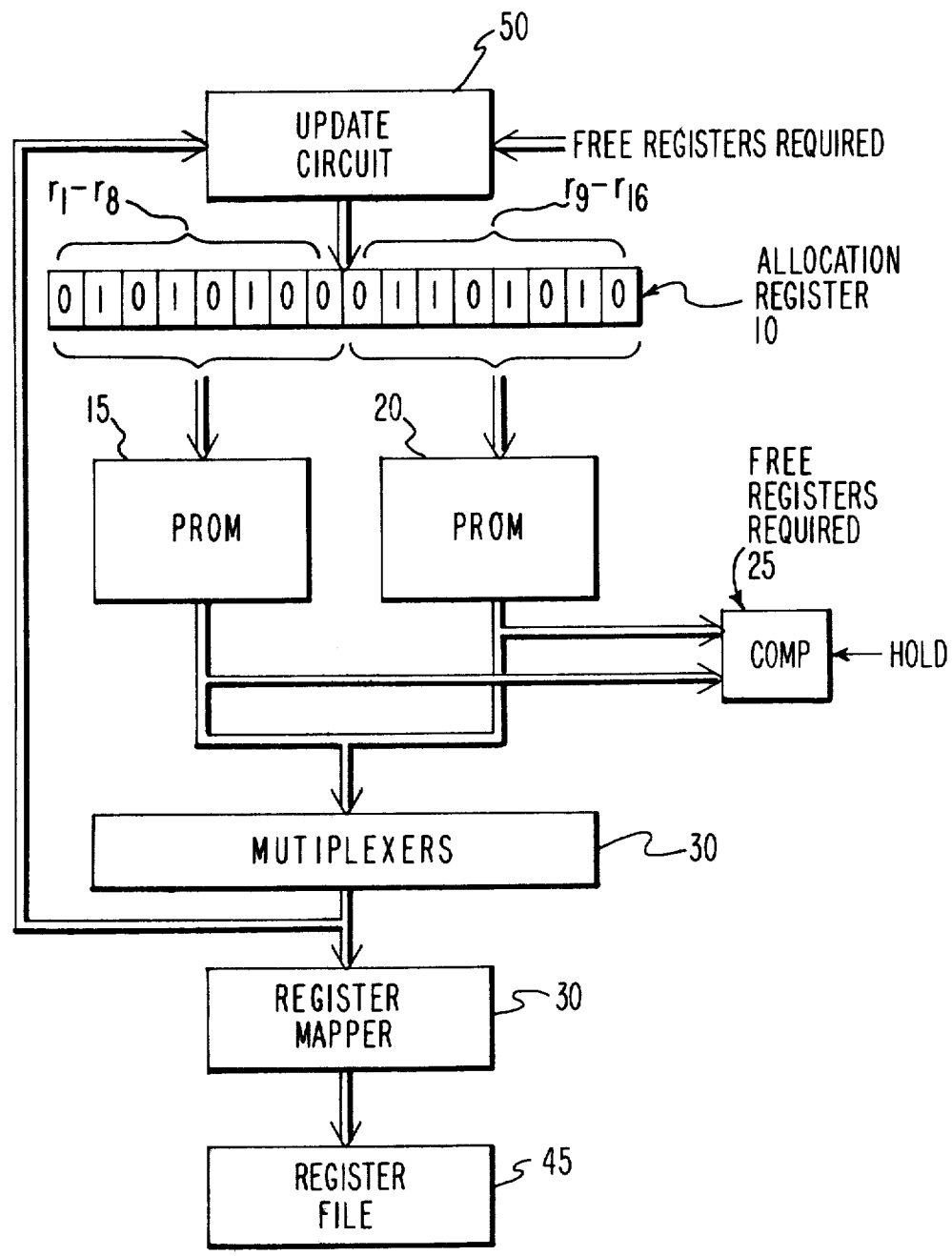
FIG. 1 is a schematic and electrical diagram illustrating a preferred embodiment of the invention.

Referring to FIG. 1, illustrated therein is a preferred embodiment of register allocation apparatus in accordance with the invention. As shown, an allocation register 10 is provided whose states indicate the free and assigned states of a plurality of assignable registers. For the purposes of this description and by way of example, it will be assumed that there are sixteen registers R1 to R16 available for assignment. Accordingly, the allocation register 10 will be assumed to contain sixteen bit storage elements $r_1-r_{16}$ respectively corresponding to the assignable registers R1-R16, wherein a "0" value of a bit storage element is used to indicate that its corresponding register is unavailable for assignment, while a "1" value indicates that the corresponding register is free and thus available for assignment. It will further be assumed by way of example that, at a particular point in time, the sixteen bit elements $r_1-r_{16}$ of the allocation register 10 have the respective values 0101010001101010 shown in FIG. 1. Thus, register 10 in FIG. 1 indicates that the seven registers R2, R4, R6, R10, R11, R13 and R15 are free registers.

As indicated in FIG. 1, the first eight bit storage elements $r_1-r_8$ of the allocation register 10 are applied as an address to a first memory 15 and the second eight bit storage elements $r_9-r_{16}$ are applied as an address to a second memory 20. Each of these memories 15 and 20 may typically be a PROM (programmable read only memory). Generally, the construction and operation of the preferred embodiment of FIG. 1 is such that appropriate portions of the selected memory words read out from memories 15 and 20 (in response to the respective addresses provided by the allocation register 10) are applied to a comparator 25 for determining whether a sufficient number of free registers are available for a newly activated task, and are also applied to a plurality of multiplexers 30 for identifying a particular number of free registers available for assignment to a newly activated task based on the current state of the elements $r_1-r_{16}$ of the allocation register 10. These free register identifications and a corresponding task identification number are stored in a register mapper 40 so that, when the register mapper 40 is accessed during task execution, these register identifications are read out and applied to a register file 45 for accessing the identified registers.

Figure 2:
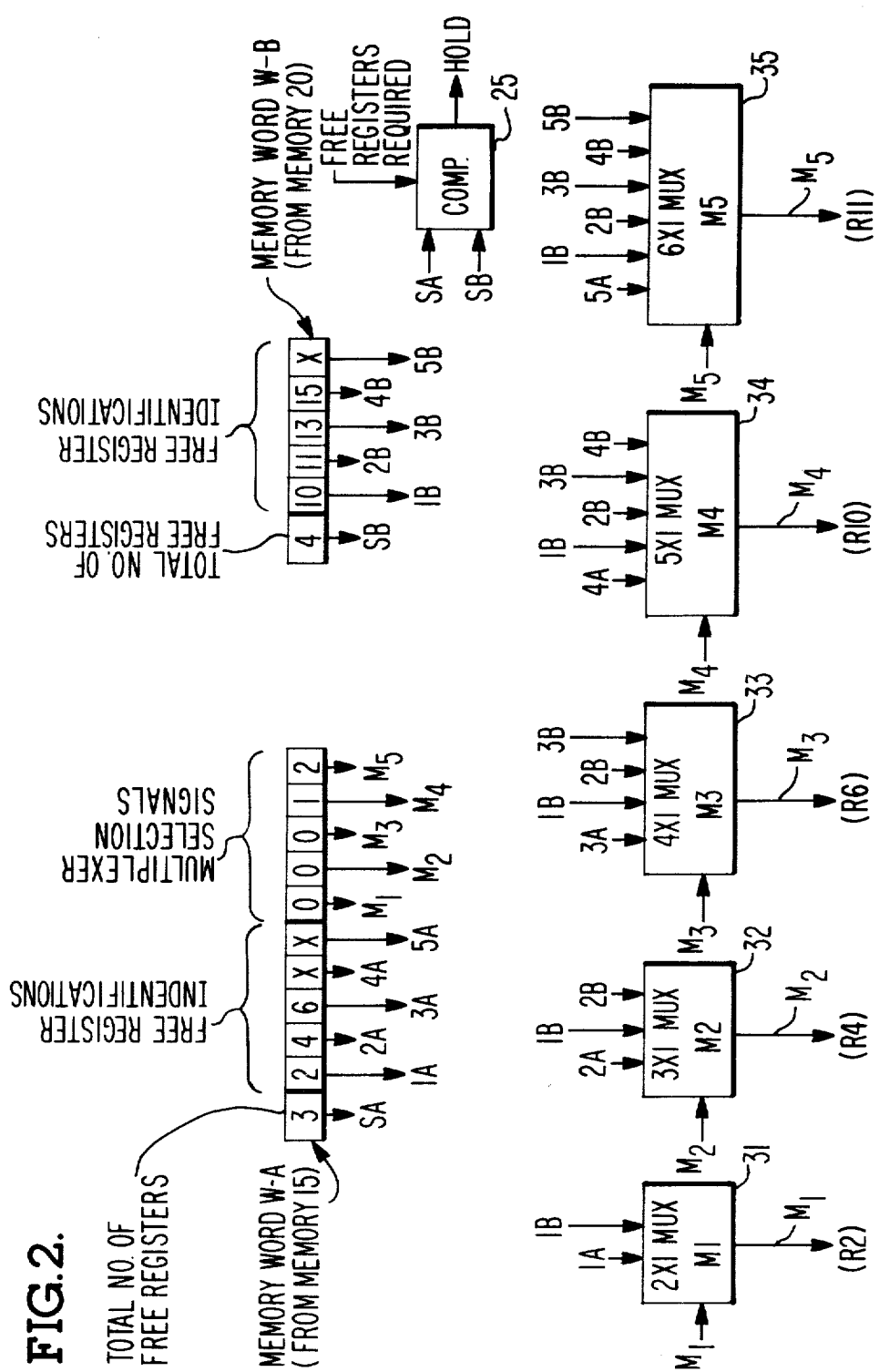
FIG. 2 is a schematic and electrical diagram illustrating details of the FIG. 1 embodiment.

The construction and operation of FIG. 1 will now be considered in more detail with reference to FIG. 2. For this purpose, and by way of example, it will be assumed that each task requires a maximum of five free registers. Accordingly, multiplexers 30 in FIG. 1 are shown in FIG. 2 as comprising the five multiplexers 31-35 whose outputs $M_1-M_5$ are binary numbers identifying five particular free registers available for assignment to a newly activated task based on the current states of the bit storage elements of the allocation register 10. For the illustrated embodiment of FIG. 2, it is assumed that these five free registers identified by the multiplexer outputs $M_1$–$M_5$ are the five lowest numbered free registers currently available, which, in conformance with the states of the allocation register 10, are registers R2, R4, R6, R10 and R11.

In order to permit the mapping of memories 15 and 20 to be readily understood, FIG. 2 illustrates examples of the particular selected memory words W-A and W-B read out from memories 15 and 20, respectively, in response to the illustrated states of their corresponding portions of the allocation register 10 shown in FIG. 1. It will be understood that, for greater clarity, decimal numbers are used in FIG. 2 to indicate the contents of the various memory word portions; however, these decimal numbers are preferably stored in binary form in memories 15 and 20. It will also be understood that the selected memory word W-A from memory 15 provides data relative to registers R1–R8 (since memory 15 is addressed by elements $r_1$–$r_8$ of register 10), while the memory word W-B from memory 20 provides data relative to registers R9–R16 (since memory 20 is addressed by elements $r_9$–$r_{16}$ of register 10). Thus, proceeding from left to right, the left-most portion of each memory word contains a number (designated SA for memory word W-A and SB for memory word W-B) indicating the total number of free registers in accordance with the states of the respective elements of the allocation register 10 in FIG. 1. The next portion of each memory word (designated 1A, 2A, 3A, 4A, 5A for memory word W-A and 1B, 2B, 3B, 4B, 5B for memory word W-B) identifies (also in accordance with its respective elements of register 10) up to five free registers beginning with the lowest number free register; an "X" indicates that no additional free registers are available besides those indicated and may typically have a "don't care" value such as "0" (since there is no "0" register).

Thus, for memory word W-A in FIG. 2, SA properly indicates a total of three free registers for W-A, and SB properly indicates a total of four free registers for W-B. Also, 1A, 2A and 3A of memory word W-A respectively identify the three free registers 2, 4 and 6 indicated by elements $r_1$–$r_8$ of register 10, while 4A and 5A are properly indicated as "X" (don't care) values (since elements $r_1$–$r_8$ indicate no other free registers). In a similar manner, 1B, 2B, 3B, 4B of memory word W-B respectively identify the four free registers 10, 11, 13 and 15 indicated by elements $r_9$–$r_{16}$ of register 10, while 5B indicates a "don't care" value (since elements $r_9$–$r_{16}$ indicate no other free registers).

It will be noted in FIG. 2 that memory word W-A additionally includes portions designated as $m_1$, $m_2$, $m_3$, $m_4$ and $m_5$. These portions could alternatively be included with memory word W-B or they could be split up between the two memory words. As indicated in FIG. 2, these $m_1$, $m_2$, $m_3$, $m_4$ and $m_5$ portions are respectively applied as selection signals to multiplexers M1, M2, M3, M4 and M5, and different pluralities of portions 1A to 5A and 1B to 5B of memory words W-A and W-B are respectively applied as register identification input signals to each of multiplexers M1–M5. As is to be expected, the size of each of the multiplexers M1–M5 and the number of bits required for each of $m_1$–$m_5$ are dependent on the number of 1A to 5A and 1B to 5B input applied to each multiplexer.

The choice of the values of $m_1$–$m_5$ and the particular pluralities of portions 1A to 5A and 1B to 5B to be applied to each of multiplexers M1–M5 in FIG. 2 is based on obtaining, at the multiplexer outputs, identifications of a particular group of free registers for assignment to each newly activated task. In the preferred embodiment, this particular group of free registers is chosen as the five lowest numbered free registers which, for the exemplary states of the allocation register 10 illustrated in FIG. 1, are registers R2, R4, R6, R10 and R11 as indicated at the multiplexer outputs in FIG. 2. The tables of FIG. 3 set forth the operation of the multiplexers M1–M5 in response to the respective $m_1$–$m_5$ and 1A to 5A and 1B to 5B signals applied thereto (as shown in FIG. 2), whereby the five lowest numbered free registers are identified at the multiplexer outputs.

The tables of FIG. 3 will now be considered in more detail with specific reference to the exemplary values of the memory words W-A and W-B illustrated in FIG. 2.

It will be understood from FIGS. 2 and 3 that multiplexer M1 has only the two inputs 1A and 1B from memory words W-A and W-B applied thereto so that its selection input $m_1$ need only be a single bit. Since 1A of memory word W-A contains a "2" identifying R2 as the lowest number free register, the value of $m_1$ for word W-A is chosen as a "0" to cause the contents of 1A (which identifies register R2 as a free register) to be selected as the output of multiplexer M1. In this regard, it is to be noted that the respective $m_1$, $m_2$, $m_3$, $m_4$, $m_5$ inputs for the multiplexers M1–M5 in the preferred embodiment are chosen so that each multiplexer selects the lowest numbered input of the particular plurality of 1A–5A and 1B–5B inputs applied thereto which identifies a free register, with an "A" input being selected ahead of a "B" input.

As indicated in FIG. 2 multiplexer M2 has the three inputs 2A, 1B and 2B of memory word W-A and W-B applied thereto so that $m_2$ requires two bits for selecting among 2A, 1B and 2B, as illustrated in the multiplexer M2 table in FIG. 3. Since 2A of memory word W-A contains a "4" identifying R4 as a free register, $m_2$ for word W-A is chosen as "00" to cause the contents of 2A (which identifies register R4 as a free register) to be selected as the output of multiplexer M2.

Multiplexer M3 in FIG. 2 has the four inputs 3A, 1B, 2B, 3B from memory words W-A and W-B applied thereto which, like $m_2$, requires a two bit $m_3$ input for selection as illustrated in FIG. 3. Since 3A of memory word W-A contains a "6" identifying R6 as a free register, $m_3$ for word W-A is chosen as "00" to cause the contents of 3A (which identifies register R6 as a free register) to be selected as the output of multiplexer M3.

Multiplexer M4 in FIG. 2 has the five inputs 4A, 1B, 2B, 3B, 4B from memory words W-A and W-B applied thereto which requires a three bit $m_4$ input for selection as illustrated in FIG. 3. The first free register identified by the inputs applied to M4 is indicated by 1B which contains a "10" identifying register R10 as a free register. Thus, in accordance with FIG. 3, $m_4$ is chosen as "001" to cause the contents of 1B to be selected as the output of multiplexer M4.

The remaining multiplexer M5 in FIG. 2 has the six inputs 5A, 1B, 2B, 3B, 4B, 5B from memory words W-A and W-B applied thereto which, like $m_4$, requires a three bit $m_5$ input for selection as illustrated in FIG. 3. The first free register identified by the inputs applied to M5 is indicated by 2B which contains an "11" identifying register R11 as a free register. Thus, in accordance with FIG. 3, $m_5$ is chosen as 010 (which is "2" in decimal) to cause the contents of 2B to be selected as the output of multiplexer M5.

Referring back to FIG. 1, it will be seen that the free register identifications provided at the output of the multiplexers 30 are applied to an update circuit 50 along with the number of free registers required by the task. The update circuit 50 responds to these inputs by providing an output to the allocation register 10 which updates the values of the storage elements $r_1$–$r_{16}$ accordingly.

Having described how selection of the five lowest numbered free registers is accomplished in the preferred embodiment illustrated in FIGS. 1-3, it will next be considered how the situation is handled by the preferred embodiment when there are insufficient free registers available for assignment to a newly activated task.

It will be remembered that the SA and SB portions of memory words W-A and W-B contain the total number of free registers indicated by their respective portions of the allocation register 10 in FIG. 1. Accordingly, these SA and SB values are applied to the comparator 25 which also receives an input indicating the number of free registers required by a newly initiated task. The comparator 25 compares the sum of SA and SB with the number of free registers required by the task. If insufficient free registers are available, the comparator 25 produces a HOLD signal which is used to cause the task to wait until sufficient free registers are available.

Although the description provided herein has been directed to a particular preferred embodiment, it is to be understood that many modifications and variations in structure, arrangement, components, operations and use are possible without departing from the spirit of the invention. The present invention should accordingly be considered as encompassing all such possible modifications and variations coming within the scope of the appended claims.

What is claimed is:

1. For use in a data processing system, resource allocation apparatus comprising:
   storage means indicating the free and assigned states of a plurality of resources, said storage means including a plurality of portions, each portion indicating the free and assigned states of a particular predetermined plurality of said plurality of resources;
   a plurality of individually addressable memories, each memory being addressed by a respective one of said portions and being operative in response thereto for providing a corresponding memory output including free resource identifying signals which identify at least a predetermined plurality of the free resources indicated by the applied portion, the memory outputs from said memories also including a plurality of selection signals; and
   a plurality of selection means to which said memory outputs are applied, each selection means receiving particular ones of said free resource identifying signals and said selection signals and being operative in response thereto so that the outputs of said selection means select a particular predetermined plurality of the free resources identified by said free resource identifying signals.

2. The invention in accordance with claim 1, wherein said plurality of selection means comprises a plurality of multiplexers, one for each resource to be selected, wherein each multiplexer receives as a multiplexer input a different combination of said free resource identifying signals provided by said memory outputs, and wherein each multiplexer receives as a selection input a respective one or more of said selection signals provided by said memory outputs.

3. The invention in accordance with claim 2, wherein said multiplexers successively receive a greater number of said resource identifying signals.

4. The invention in accordance with claim 1, wherein said plurality of resources are a plurality of registers.

5. The invention in accordance with claim 1, wherein each of said memories is a programmable read only memory.

6. The invention in accordance with claim 1, 2, 3 or 4, including updating means responsive to the outputs of said selection means for updating said storage means.

7. The invention in accordance with claim 1, 2 or 3, wherein each memory stores a plurality of individually addressable memory words, one of which is selected by the applied portion for providing the memory output of the memory, wherein each memory word contains resource identifying data identifying at least a predetermined plurality of the free resources indicated by the applied portion, said resource identifying data corresponding to the resource identifying signals in the memory output, and wherein the memory words of at least one memory includes a plurality of selection data items, one item for each selection means, said selection data items corresponding to said selection signals in the memory output.

8. The invention in accordance with claim 7, wherein said selection data items are chosen in conjunction with the choice of the predetermined plurality of resource identifying signals applied to each selection means so that a predetermined ordered group of free resources are selected at the outputs of said selection means.

9. The invention in accordance with claim 8, wherein said resources are designatable in a particular numerical order, and wherein the choice of said selection data items and the choice of the predetermined plurality of resource identifying signals applied to each selection means are such that the lowest numbered free resources are selected at the outputs of said selection means.

10. The invention in accordance with claim 1, 2, 3 or 4, wherein said system operates by performing a plurality of tasks, wherein each task requires the assignment of one or more free resources thereto, and wherein resource mapping means are provided for storing the outputs of said selection means and a corresponding task identification.

11. The invention in accordance with claim 1, 2, 3 or 4, wherein each memory output also includes signals representing the number of free registers indicated by its respective portion of said storage means, and wherein comparison means are provided responsive to these signals representing the number of free registers for providing a hold indication when there are insufficient free resources available for a task.

* * * * *